(12) United States Patent
Oka

(10) Patent No.: US 6,798,425 B2
(45) Date of Patent: Sep. 28, 2004

(54) GRAPHICS DETECTION METHOD, GRAPHICS DETECTION APPARATUS, SEMICONDUCTOR DEVICE, COMPUTER PROGRAM AND RECORDING MEDIUM

(75) Inventor: Masaaki Oka, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 395 days.

(21) Appl. No.: 09/938,382

(22) Filed: Aug. 24, 2001

(65) Prior Publication Data

US 2002/0050994 A1 May 2, 2002

(30) Foreign Application Priority Data

Aug. 24, 2000 (JP) .................................. 2000-254064
Aug. 22, 2001 (JP) .................................. 2001-251988

(51) Int. Cl.[7] .............................................. G06T 11/00
(52) U.S. Cl. ........................ 345/666; 345/421; 345/427
(58) Field of Search ................................ 345/421, 666, 345/427; 382/232

(56) References Cited

U.S. PATENT DOCUMENTS 5,455,599 A  * 10/1995 Cabral et al. ................ 345/440
5,877,768 A  *  3/1999 Jain ............................. 345/421
6,169,550 B1 *  1/2001 Jain ............................. 345/421

* cited by examiner

Primary Examiner—Jeffery Brier
Assistant Examiner—Motilewa Good-Johnson
(74) Attorney, Agent, or Firm—Lerner, David, Littenberg, Krumholz & Mentlik, LLP

(57) ABSTRACT

A three-dimensional graphic having a specific positional relationship with a predetermined point in an image made up of a three-dimensional graphic is detected. The image controller adds index information for identification to a plurality of three-dimensional graphics. The drawing device forms two-dimensional projected images by projecting the plurality of three-dimensional graphics onto predetermined planes. The two-dimensional projected images are assigned the index information corresponding to the index information assigned to the relevant three-dimensional graphics. When the projecting point(s) of a predetermined point in the image exist in the two-dimensional projected images, the graphics detector detects index information assigned to the two-dimensional projected images and detects the three-dimensional graphics assigned the index information corresponding to the detected index information.

19 Claims, 7 Drawing Sheets

| GRAPHICS NAME | INDEX INFORMATION | POSITIONAL COORDINATES | TEXTURE COORDINATES | ...... |
|---|---|---|---|---|
| GRAPHIC 1 | 1 | X1,Y1,Z1 | U1,V1 | ...... |
| GRAPHIC 2 | 2 | X2,Y2,Z2 | U2,V2 | ...... |
| GRAPHIC 3 | 3 | X3,Y3,Z3 | U3,V3 | ...... |
| ⋮ | ⋮ | ⋮ | ⋮ | ...... |

GRAPHICS DETECTION METHOD, GRAPHICS DETECTION APPARATUS, SEMICONDUCTOR DEVICE, COMPUTER PROGRAM AND RECORDING MEDIUM

CROSS-REFERENCE TO RELATED APPLICATIONS

This application is based upon and claims the benefit of priority from the prior Japanese Patent Applications Nos. 2000-254064, filed Aug. 24, 2000, and 2001-251988 filed Aug. 22, 2001, the entire contents of both of which are incorporated herein by reference.

BACKGROUND OF THE INVENTION

1. Field of the Invention

The present invention relates to a technology for detecting a three-dimensional graphic, which has a specific positional relationship with a predetermined point in an image made up of at least one three-dimensional graphic.

2. Description of the Related Art

Entertainment apparatuses such as video game machines with improved image processing capacities are capable of providing more realistic game images. For example, there are many video games displaying images such as an object or character moving around in a three-dimensional space that allow the player to experience the realism of a live performance and to be immersed in the game world.

Some of these video games present characters such as people and automobiles in a three-dimensional image made up of various objects, which are manipulatable by the player and exert some influences upon the objects. For example, an automobile (character) running in an auto race game dashes off a stone (object) on the road or a person (character) lifts a nearby object, etc.

Some video games use a positional relationship between the character and object as a condition that enables the character to exert an influence on the object in the three-dimensional image. This allows the character to exert an influence on the object only when the character and object have a specific positional relationship.

The positional relationship between the character and object may be such a positional relationship that, when, for example, a three-dimensional image is projected onto an XY plane in the orthogonal coordinate system made up of X, Y and Z axes, projecting points of points expressing the position of the character overlap the projected image (two-dimensional projected image) of the object (the character exists above or below the object) or such a positional relationship that the two-dimensional projected image of the object among the plurality of objects on the XY plane approaches closest to the above-described projecting points (object that approaches closest to the character when viewed from a high place in the air), etc.

Information on graphics that express individual objects such as stone and road that make up an image is controlled by a table, etc.

The table includes information necessary to display the graphics such as positional coordinates expressing the positions of the respective graphics and texture coordinates and the information is updated every time the positional coordinates, etc. change.

This table is configured according to the order in which objects are created and sorting by the positional coordinates expressing the positions of the graphics in the image is not performed. For example, the table is not intended to control graphics in the order of sorting based on the X coordinate. As described above, in order for a character to exert some influence on an object, it is necessary to examine whether the character and object have a specific positional relationship or not. For this purpose, it is necessary to scan the whole table and examine the positional relationship between the graphics expressing the respective objects and the character. For example, in order to examine whether an object exists below an automobile or not in an auto race game, it is necessary to examine the positional relationship between the automobile and the respective objects from the positional coordinates of the automobile and the positional coordinates of all graphics recorded in the table.

Scanning the whole table is extremely time-consuming processing. A possible way of speeding up this processing is sorting by the positional coordinate of graphics beforehand. This requires, however, two kinds of table; a table containing the sorting result and the original table, to be maintained, thus consuming an extra memory area. Furthermore, when images are created in real time as the game progresses, sorting must also be carried out in real time, which may slow down the processing speed.

Furthermore, the positional relationship between the character and object is conventionally examined using points (vertices, etc.) that determine the respective shapes. For this reason, depending on the shape of the object, specified graphics may not be found in a desired positional relationship. For example, when it is desired to detect an object that approaches closest to a character, though a graphics is judged to be closest to the object from a comparison of the distance between vertices, there may be actually another graphics, which is closer to the object.

SUMMARY OF THE INVENTION

It is a subject of the present invention to provide a technology for detecting a graphics that expresses an object which is in a specific positional relationship with specific points in a three-dimensional image, for example, points expressing the position of a character, without wasting hardware resources or reducing the processing speed.

It is another subject of the present invention to provide a technology for detecting a graphics that expresses an object, which is in a specific positional relationship with specific points in a three-dimensional image independently of the shape of an object.

The present invention proposes a specific mechanism for detecting graphics of an object from a positional relationship on a two-dimensional projected image between a predetermined point in a three-dimensional image and the graphics expressing the object using the function of forming a two-dimensional image (two-dimensional projected image) by projecting a three-dimensional image from a predetermined direction, which is provided as standard for an image processing apparatus implemented by an entertainment apparatus such as a general-purpose computer and video game machine. More specifically, the present invention provides a graphics detection method, graphics detection apparatus, semiconductor device and computer program.

The graphics detection method of the present invention is a graphics detection method executed by an apparatus for detecting a three-dimensional graphic which has a specific positional relationship with a predetermined point in an image configured by including a three-dimensional graphic, comprising a first stage of adding identification information for identifying the three-dimensional graphics to the three-dimensional graphics, a second stage of adding to a two-dimensional projected image formed by projecting individual three-dimensional graphics onto a predetermined plane the identification information corresponding to the identification information added to the three-dimensional graphics and a third stage of detecting the identification information added to the two-dimensional projected image when there are projecting points of the specific points within the two-dimensional projected image and detecting the three-dimensional graphics to which the identification information corresponding to the detected identification information is added.

"Predetermined points" refer to, for example, points indicating the position of a character or object. The predetermined point make it possible to detect a graphics having such a positional relationship that projecting points are included in the two-dimensional projected image.

Generating a two-dimensional projected image from a three-dimensional graphic using the function provided for the conventional image processing apparatus as described above makes it possible to detect the graphics without consuming extra hardware resources. Detecting identification information from the two-dimensional projected image and detecting the three-dimensional graphics having the detected identification information allows graphics to be detected speedily without being affected by the number of three-dimensional graphics. Adding identification information to the two-dimensional projected image makes it possible to detect a three-dimensional graphic having a specific positional relationship with a predetermined point also taking into account the shape of the two-dimensional projected image.

When a three-dimensional graphic is projected onto a predetermined plane and a two-dimensional projected image is formed, either one of the following three modes can be selected:

(1) Without expanding or contracting the three-dimensional graphics or two-dimensional projected image, the same identification information is added to both to identify them respectively.

(2) A plurality of two-dimensional images formed by expanding or contracting a three-dimensional graphic with a plurality of mutually different levels of magnification ratio or contraction ratio and then projecting the three-dimensional graphics is overlapped one atop another to form gradation, and identification information which differs according to the level of magnification ratio or contraction ratio is added to the respective two-dimensional projected images. The projected images in this case can be orthographic projected images (expansion or contraction of the three-dimensional graphics) or perspective projected images (the magnification ratio of projection is changed while the three-dimensional graphics remains the same).

(3) When a three-dimensional graphic is expanded or contracted, it is also possible to gradually change the identification information to be added thereto according to the magnification ratio or contraction ratio and the distance from the center of magnification or contraction. Furthermore, the identification information is made variable following the variation in the magnification ratio or contraction ratio to make the direction in which the identification information changes identical to the direction in which the magnification ratio or contraction ratio changes. This method can be easily implemented using a smooth shading function provided as standard for an apparatus handling computer graphics.

It is also possible to form gradation while gradually expanding or contracting the graphics or form gradation at a stroke from the beginning. The first one is the processing method suited to a case where there is enough processing time for two-dimensional projected images whereas there is not enough processing field for drawing the two-dimensional projected images (image memory, etc.). The second one is the opposite. The narrower the gradation and the greater the number of steps of gradation, the finer expression can be realized.

It is also possible to expand or contract the two-dimensional projected image in order that one piece of identification information is detected. Expanding the two-dimensional projected image makes it possible to detect a two-dimensional projected image closest to the projecting point. Contracting the two-dimensional projected image makes it possible to detect a two-dimensional projected image closest to the center at the projecting point.

In the above methods (2) and (3), it is also possible to include in the identification information, addition information which changes according to the size of the three-dimensional graphics and change the addition information according to the degree of expansion or contraction and the distance from the center of magnification or contraction when the two-dimensional projected image is expanded or contracted and detect the degree of closeness between the two-dimensional projected image and the projecting points according to the changed addition information. In this case, if, for example, the identification information is expressed with a numerical value of a plurality of digits, a numerical value of at least one of the plurality of digits identifies the three-dimensional graphics and a numerical value of at least one of the rest of digits is the addition information, then the three-dimensional graphics can be detected even if the addition information changes.

Or it is also possible to express the identification information using a numerical value to uniquely identify the three-dimensional graphics and change this numerical value in stages according to the level of the magnification ratio or contraction ratio of the two-dimensional projected image or the distance from the center of magnification or contraction to make it possible to detect the degree of closeness between the two-dimensional projected image and said projecting point based on this numerical value.

It is also possible to add identification information, which is not added to any three-dimensional graphics to the area where the two-dimensional projected image is not formed when the image is projected onto the plane. This makes it possible, for example, to determine speedily from the detected identification information whether it is the area where the three-dimensional graphics is projected or not.

It is also possible to form a plurality of two-dimensional projected images to determine a three-dimensional graphic. For example, in the second stage, the three-dimensional image is projected onto a plurality of different planes to form a plurality of two-dimensional projected images respectively and the identification information corresponding to the identification information added to the three-dimensional graphics is added to the two-dimensional projected images on the respective planes, and in the third stage, when the projecting points exist in the plurality of two-dimensional projected images, the identification information added to the two-dimensional projected images are detected and a three-dimensional graphic is detected based on the detected identification information.

According to this method, detecting, for example, in the third stage, the three-dimensional graphics to which the identification information commonly detected in all of the plurality of two-dimensional projected images is added, or a three-dimensional graphic for which the numerical values of identification information in all of said plurality of two-dimensional projected images fall within the respective ranges assigned thereto respectively, both make it possible to readily detect the three-dimensional graphics in a position including the predetermined point in the three-dimensional graphic.

The graphics detection apparatus of the present invention is a graphics detection apparatus for detecting a three-dimensional graphic which has a specific positional relationship with a predetermined point in an image configured by including a three-dimensional graphic, comprising means for adding identification information for identifying the three-dimensional graphics to the three-dimensional graphics, drawing means for adding to a two-dimensional projected image formed by projecting individual three-dimensional graphics onto a predetermined plane the identification information corresponding to the identification information added to the three-dimensional graphics and detecting means for detecting the identification information added to the two-dimensional projected image when there are projecting points of the specific points within the two-dimensional projected image and detecting the three-dimensional graphics to which the identification information corresponding to the detected identification information is added.

The semiconductor device of the present invention is a semiconductor device for detecting a three-dimensional graphic which has a specific positional relationship with a predetermined point in an image configured by including a three-dimensional graphic, comprising means for adding identification information for identifying the three-dimensional graphics to the three-dimensional graphics, means for adding to a two-dimensional projected image formed by projecting individual three-dimensional graphics onto a predetermined plane the identification information corresponding to the identification information added to the three-dimensional graphics and means for detecting the identification information added to the two-dimensional projected image when there are projecting points of the specific points within the two-dimensional projected image and detecting the three-dimensional graphics to which the identification information corresponding to the detected identification information is added.

The computer program of the present invention is a computer program for rendering a computer to serve as a graphics detection apparatus for detecting a three-dimensional graphic which has a specific positional relationship with a predetermined point in an image configured by including a three-dimensional graphic, the graphics detection apparatus comprising a step of adding identification information for identifying the three-dimensional graphics to the three-dimensional graphics, a step of adding to a two-dimensional projected image formed by projecting individual three-dimensional graphics onto a predetermined plane the same identification information as the identification information added to the three-dimensional graphics and a step of detecting the identification information added to the two-dimensional projected image when there are projecting points of the specific points within the two-dimensional projected image and detecting the three-dimensional graphics to which the identification information corresponding to the detected identification information is added.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

An embodiment of the present invention will be specifically described with reference to the drawings accompanying herewith.

<Entertainment Apparatus>

Figure 1:
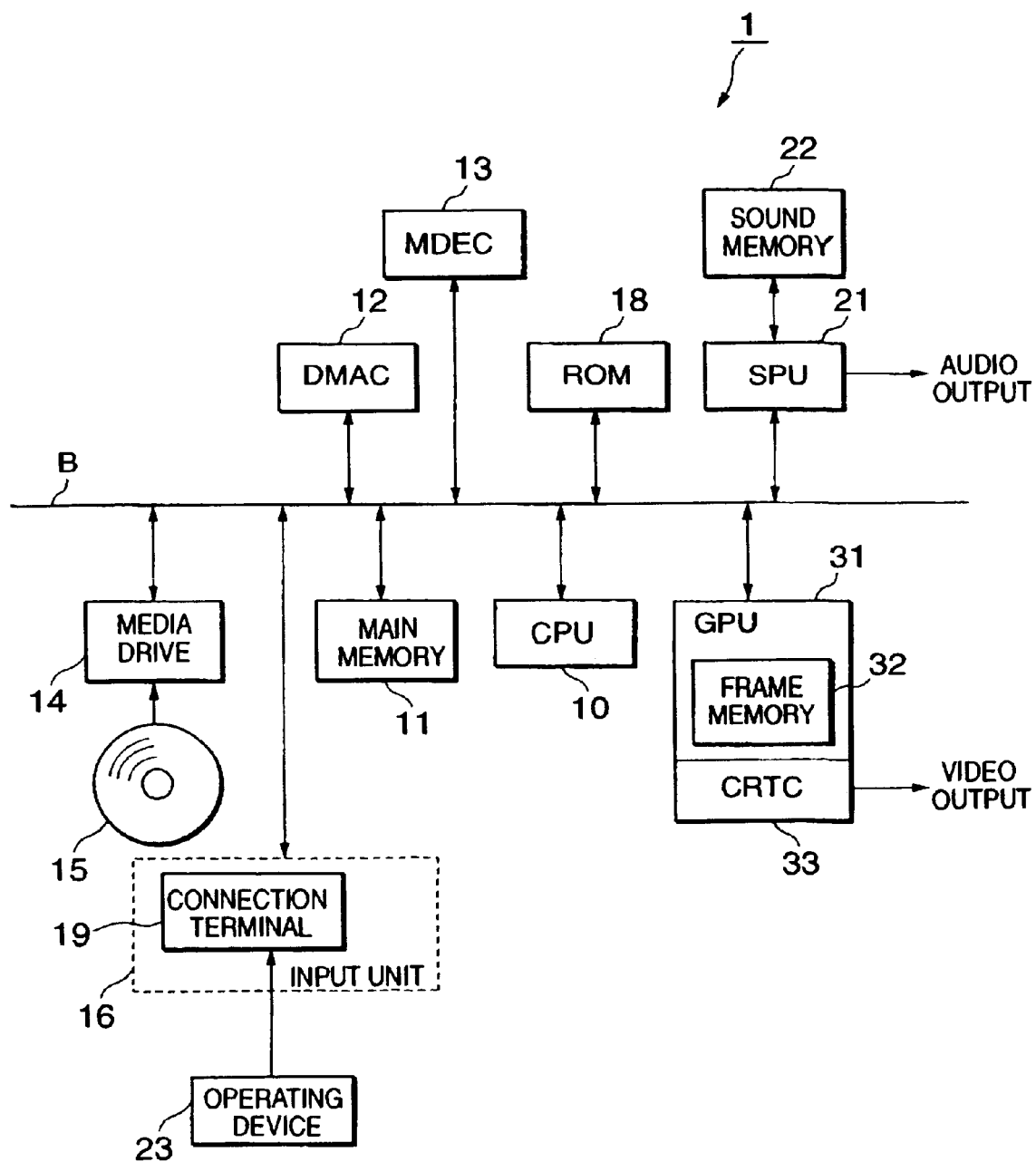
FIG. 1 is an internal block diagram of an entertainment apparatus to which the present invention is applied.

FIG. 1 is an internal block diagram of an entertainment apparatus to which the present invention is applied.

The entertainment apparatus 1 is configured by including a CPU (Central Processing Unit) 10, a main memory 11 made up of a RAM, a DMAC (Direct Memory Access Controller) 12, an MPEG (Moving Picture Experts Group) decoder (MDEC) 13, a media drive 14 for mounting a medium 15 such as a CD-ROM or DVD-ROM, an input unit 16, a ROM 18 for storing a program such as BIOS, a sound processing unit (SPU) 21 for reading sound data stored in a sound memory 22 and outputting as audio output and a graphic processing unit (hereinafter referred to as "GPU") 31 having a frame memory 32. These are connected via a bus B.

The GPU 31 is connected with a CRTC (CRT controller) 33 for generating a video output signal. This video output signal is generated in compliance with standards of NTSC and PAL, etc., and output from the CRTC 33 to a display (not shown).

The CPU 10 is a semiconductor device that loads a start program from the ROM 18 at the startup of the entertainment apparatus 1, executes the start program and operates an operating system. The CPU 10 also has the functions of controlling the media drive 14, reading an application program or data from the medium 15 mounted in this media drive 14 and storing this in the main memory 11. The CPU 10 further has the functions of applying geometry processing (coordinate value calculation processing) to various data read from the medium 15, for example, three-dimensional graphics data (coordinate values of vertices of a polygon, etc.) made up of a plurality of basic graphics (polygons) and generating a display list containing geometry-processed polygon definition information (specifications of shape of polygon used, its formation position, type, color or texture, etc. of components of the polygon).

The GPU 31 is a semiconductor device that has the functions of storing drawing context (type, color or texture, size, etc. of components of polygon for drawing), carrying out rendering processing (ordinary processing) using the display list notified from the CPU 10 and drawing polygons in the frame memory 32. The frame memory 32 can also use this as a texture memory. The frame memory 32 can also use this as a texture memory. Thus, a pixel image in the frame memory 32 can be pasted as texture to a polygon to be drawn.

The SPU 21 is a semiconductor device that synthesizes sound data read from the sound memory 22 into an audio output signal. The DMAC 12 is a semiconductor device that carries out DMA transfer control over the circuits connected to the bus B. The MDEC 13 is a semiconductor device that operates in parallel with the CPU 10 and has the function of expanding data compressed in MPEG (Moving Picture Experts Group) or JPEG (Joint Photographic Experts Group) systems, etc.

The input unit 16 is provided with a connection terminal 19 through which an input signal from an operating device 23 is input. The operating device 23 is provided with a plurality of operation buttons and allows the operator to control images and output sound using these operation buttons in a variety of ways. Characters in an image are manipulated through these operation buttons.

<Configuration of Graphics Detection Apparatus>

A configuration example when the above-described entertainment apparatus 1 is operated as the graphics detection apparatus of the present invention will be explained.

The graphics detection apparatus is implemented by the CPU 10 and GPU 31 of the entertainment apparatus 1 loading and executing predetermined computer programs recorded in the ROM 18, or other recording medium such as the medium 15.

Figures 2, 3:
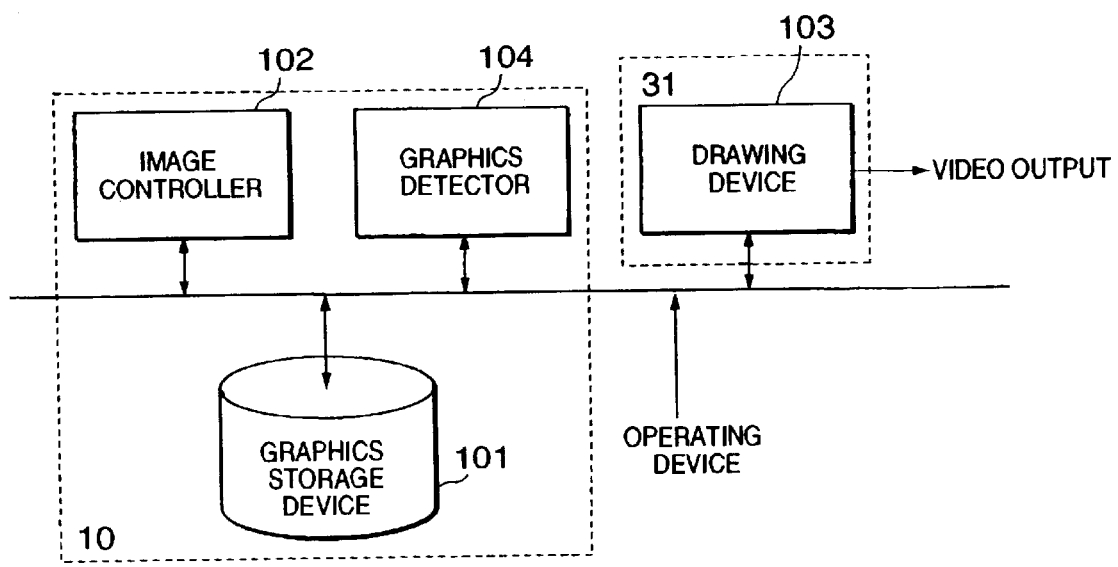
FIG. 2 is a main functional block diagram of the present invention.
FIG. 3 is an example of a table of three-dimensional graphics data.

FIG. 2 is a functional block diagram of the entertainment apparatus 1 when the entertainment apparatus 1 operates as the graphics detection apparatus. In this embodiment, the CPU 10 and computer program form functional blocks (modules) of an image controller 102 and a graphics detector 104 inside the CPU 10, and form a graphics storage device 101 in a memory area (not shown) in the CPU 10.

Furthermore, the GPU 31 and computer program form a functional block (module) of the drawing device 103 in the GPU 31.

These functional blocks generate a three-dimensional image made up of at least one three-dimensional graphic that expresses an object. The three-dimensional graphics is assigned index information (identification information) for identifying the graphics. The two-dimensional projected image obtained by projecting the three-dimensional graphics onto a predetermined plane is assigned the index information corresponding to the index information assigned to the three-dimensional graphics. The index information of the two-dimensional projected image at a position including predetermined projecting points in the three-dimensional image is detected and the there-dimensional graphics assigned the index information corresponding to the detected index information is detected.

The graphics storage device 101 stores three-dimensional graphics data about the three-dimensional graphics that expresses the object that makes up the three-dimensional image. The graphics storage device 101 stores the three-dimensional graphics data as a table. The three-dimensional graphics data includes index information as identification information to identify individual graphics, positional coordinates to specify the positions of graphics in a three-dimensional space and texture coordinates, etc. The positional coordinates and texture coordinates, etc. are updated according to results of geometry processing.

FIG. 3 is an example of a table about three-dimensional graphics data. This table records names of graphics, index information, positional coordinates of the graphics, texture coordinates, etc. of the respective graphics. It is possible to specify a three-dimensional graphic using the index information.

The image controller 102 reads necessary three-dimensional graphics data from the graphics storage device 101, carries out necessary processing such as geometry processing and generates two-dimensional image data. The two-dimensional image data corresponds to the display list in the relationship with the entertainment apparatus 1. The two-dimensional image data generated is sent to the drawing device 103.

The present invention provides two kinds of two-dimensional image data. These are display image data for forming an image shown on a display such as brightness, lightness or color for every pixel and index image data for forming an image to detect a three-dimensional graphic showing index information for every pixel.

The two images formed by the display image data and index image data are not necessarily the same three-dimensional image viewed from the same direction. For example, it is also possible to designate an image according to display image data (display image) as a three-dimensional image viewed from the horizontal direction and designate an image according to index image data (index image) as a three-dimensional image viewed from the vertical direction.

The image controller 102 expands or contracts the two-dimensional projected images according to the instructions from the graphics detector 104. Expansion or contraction can be performed using either one of the following two modes:

The first mode is a mode in which when index image data is created from the three-dimensional graphics, a plurality of index image data with different magnification ratios or contraction ratios is created simultaneously (or within an optimal time which may be regarded as the same time). In addition to index information to identify the three-dimensional graphics, addition information whose value varies according to the magnification ratio or contraction ratio of the two-dimensional projected image of the three-dimensional graphics is created and this addition information is sent together with the index image data to the drawing device 103.

The second mode is a mode in which when index image data is created from the three-dimensional graphics, addition information is updated according to the distance from the center of the expanded or contracted two-dimensional projected image, the drawing device 103 is instructed to set the drawing mode to smooth shading and then the index image data, etc. is sent out.

The above addition information will not be required in the case where even if the index image data changes when expanded or contracted, the corresponding index information of the three-dimensional graphics is clear.

The drawing device 103 draws an image in the frame memory 32 based on the two-dimensional image data the moment the two-dimensional image data is input.

In the case where the display image data and index image data describe the same three-dimensional image viewed from the same direction, drawing may also be carried out in the same area of the frame memory 32, but in the case where the display image data and index image data describe the three-dimensional images viewed from different directions, the images are drawn in two different areas of the frame memory 32. The display image according to the display image data is converted to a video output signal by the CRTC 33 and output. The index image according to the index image data is used for graphics detection.

The two-dimensional projected image in the index image obtained by projecting the three-dimensional graphics is assigned the index information added to the corresponding three-dimensional graphics. By the way, the area in which no two-dimensional projected image is drawn may also be assigned index information, which is not added to any three-dimensional graphics.

When two or more pieces of index information need to be written into one pixel (when two or more two-dimensional projected images are drawn on the same pixel), the drawing device 103 divides the memory area in which one-pixel data is written and writes all index information that needs to be written.

The graphics detector 104 detects index information at projecting point(s) of a predetermined point in the three-dimensional image in the index image drawn in the frame memory 32. The predetermined point refers to, for example, point that indicates the position of a character. The three-dimensional graphics to which index information corresponding to the detected index information is added is detected from the table stored in the graphics storage device 101.

It may also be arranged that in the case where the number of pieces of the detected index information is 0, the graphics detector 104 instructs the image controller 102 to expand the two-dimensional projected image in the index image and when the number of pieces of the detected index information is two or more, the graphics detector 104 instructs the image controller 102 to contract the two-dimensional projected image, and thereby ensures that one piece of the index information is detected.

<Operation of Graphics Detection Apparatus>

The entertainment apparatus 1 in the above configuration detects a three-dimensional graphic having a specific positional relationship with a predetermined point in a three-dimensional image using the following procedure.

Figure 4:
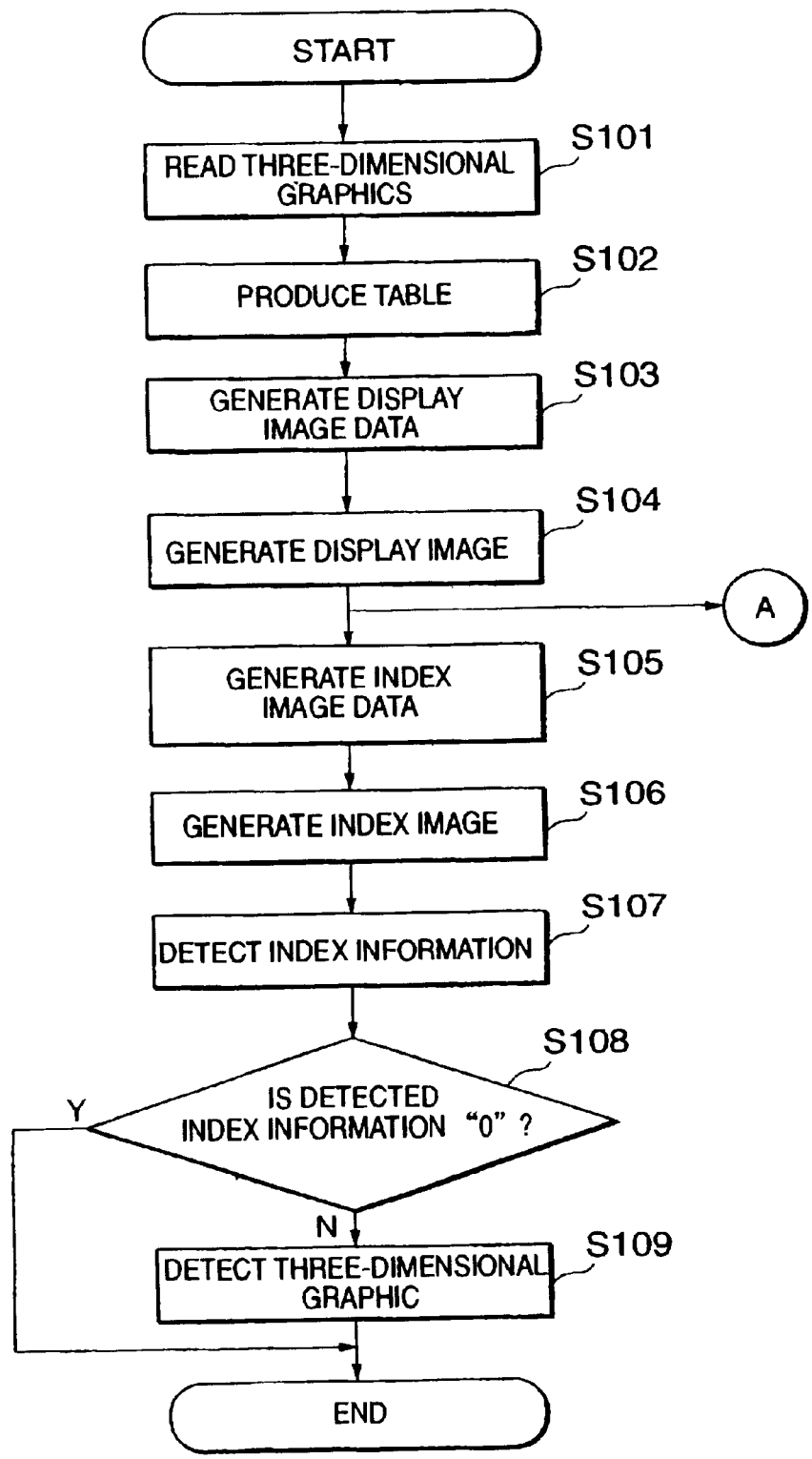
FIG. 4 is a flow chart showing a graphics detecting procedure.

FIG. 4 is a flow chart showing the graphic detecting procedure.

The image controller 102 reads three-dimensional graphics data that expresses a three-dimensional graphic that make up a three-dimensional image from the medium 15 (step S101). Then, the image controller 102 adds different pieces of index information to the respective three-dimensional graphics expressed by the three-dimensional graphics data read and creates a table (step S102). The table created is stored in the graphics storage device 101. Furthermore, the image controller 102 applies geometry processing such as coordinate transformation, perspective transformation and writing, etc. to the three-dimensional graphics data and generates display image data (step S103). In this way, a three-dimensional image at that point in time is generated. The display image data generated is sent to the drawing device 103. On the other hand, positional coordinates, etc. of the three-dimensional graphics are sent to the graphics storage device 101, where the table is updated.

The drawing device 103 forms a display image in the frame memory 32 based on the display image data received (step S104). When the image is drawn in the frame memory 32, information such as brightness, lightness, color, etc. of the relevant pixel is written in the area expressing one-pixel data.

Furthermore, the image controller 102 generates index image data from the three-dimensional image generated in step S103 (step S105). The index image data is also sent to the drawing device 103, and the index image is drawn in a predetermined area of the frame memory 32 (step S106). This gives the two-dimensional projected image in the index image provided with the same index information as the index information which is added to the relevant three-dimensional graphics. In the case where there is a plurality of three-dimensional graphics projected in one pixel, all index information of the relevant three-dimensional graphics are written.

Index information, which is not assigned to any three-dimensional graphics, is assigned to the area where no index information is written, that is, the area with no two-dimensional projected image.

Figure 7:
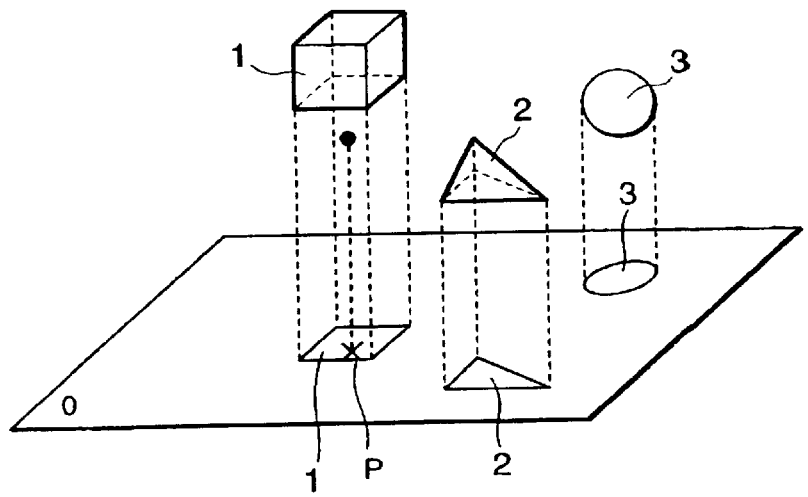
FIG. 7 is an illustrative diagram of index images.

FIG. 7 illustrates an example of an image according to the index image data. In FIG. 7, index information "1", "2" and "3" are assigned to three three-dimensional graphics expressing a cube, triangular pyramid and sphere and index information "1", "2" and "3" are assigned to a square, triangle and circle which are their respective two-dimensional projected images. The area where no two-dimensional projected image is formed is assigned index information "0".

When drawing of the index image into the frame memory 32 is completed, the graphics detector 104 detects index information of a projecting point P, which is a point when a predetermined point in the three-dimensional image is projected (step S107). The predetermined point in the three-dimensional image is, for example, a point at which a character exists in the three-dimensional image. In the case where the predetermined point is the point at which the character exists, it is possible to know a positional relationship between the two-dimensional projected image of the character and the two-dimensional projected image of the object. The graphics detector 104 detects index information written in the memory area, which corresponds to the projecting point in the frame memory 32. In FIG. 7, "1" is detected as the index information of the projecting point P.

The graphics detector 104 checks whether the detected index information is "0" or not (step S108) and if the index information is "0" (step S108: Y), finishes the graphics detection operation as is. This is because the index information "0" indicates that the projecting point does not overlap any two-dimensional projected image. When the index information is not "0" (step S108: N), the graphics detector 104 detects the three-dimensional graphics data to which the same index information as the detected index information is added (step S109). It is possible to specify the three-dimensional graphics from the detected three-dimensional graphics data. The specified three-dimensional graphics is the graphics that has a specific positional relationship with a predetermined point in the three-dimensional image.

Drawing the two-dimensional projected image obtained by projecting a three-dimensional graphic is the function provided for a conventional image processing apparatus of a video game machine, etc. The present invention can detect a three-dimensional graphic at a position including a predetermined point in the two-dimensional projected image by only drawing the index information in the frame memory 32 using this function and detecting index information written in the memory area corresponding to the two-dimensional projecting point. This makes it possible to detect a three-dimensional graphic having a specific positional relationship with the predetermined point in a short time without using extra resources. Furthermore, when there is a plurality of detected three-dimensional graphics and the only one three-dimensional graphics closest to the predetermined point is selected from among them, the distance between the coordinate values of the detected three-dimensional graphics and the coordinate values of the predetermined point is measured. However, compared to the conventional method, which requires distances of all three-dimensional graphics in the three-dimensional image to be measured, the present invention reduces the number of three-dimensional graphics subject to distance measurement considerably and can thereby shorten the processing time drastically.

Furthermore, when a plurality of expanded or contracted two-dimensional projected images is drawn with one image overlapping another, or when two-dimensional projected images are expanded or contracted, if each two-dimensional projected image is provided with addition information, this addition information is updated as required. In the second case, the addition information is made changeable in stages. If each two-dimensional projected image is not provided with addition information, the index information added to the two-dimensional projected image is changed. Such processing can be implemented using the above-described smooth shading function.

This makes it possible to detect desired graphics easily.

Figure 9:
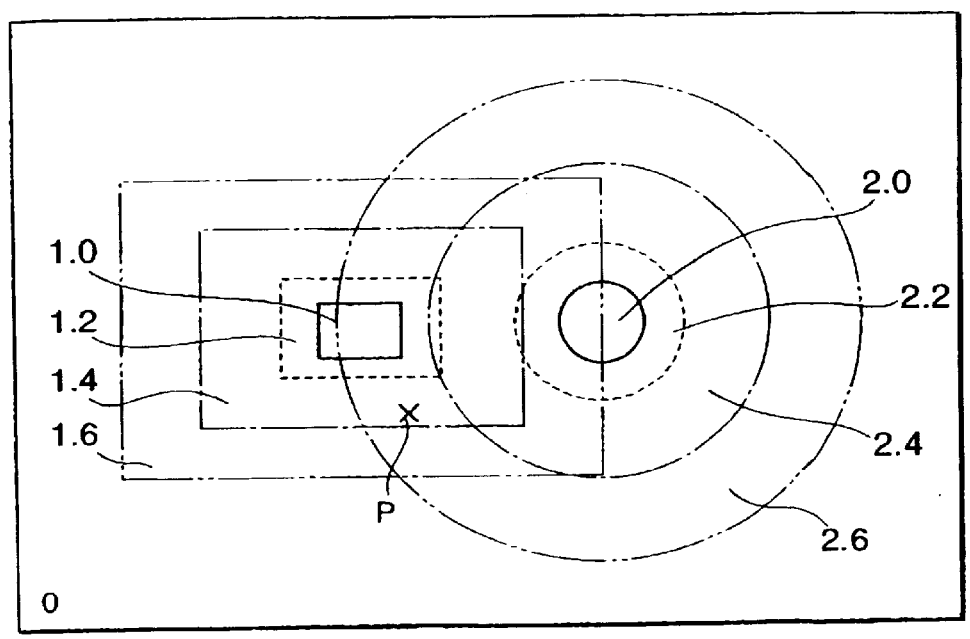
FIG. 9 is an illustrative diagram of two-dimensional projected images when index information is changed according to a magnification ratio.

FIG. 9 is an illustrative diagram in the case where addition information is changed when two-dimensional projected images are expanded. The original two-dimensional projected images are a rectangle and circle drawn with solid lines and assigned "1.0" and "2.0" as index information, respectively. The first digit denotes the information to detect a three-dimensional graphic and the decimal point denotes addition information. For example, if the first digit is "1", the graphics whose index information is "1" is detected.

The two-dimensional projected images are each expanded 2 times, 4 times and 6 times, and for example, the index information of expanded images of the two-dimensional projected image of the rectangle is assumed "1.2", "1.4" and "1.6", while the index information of expanded images of the two-dimensional projected image of the circle is assumed "2.2", "2.4" and "2.6". In the case of the rectangle, the index information is "1.2" between the solid line and dotted line, "1.4" between the dotted line and single-dot dashed line and "1.6" between the single-dot dashed line and two-dot dashed line. In the case of the circle, the index information is "2.2" between the solid line and dotted line, "2.4" between the dotted line and single-dot dashed line and "2.6" between the single-dot dashed line and two-dot dashed line.

FIG. 9 shows that the projecting point P is in the area of the index information "1.4" of the two-dimensional projected image of the rectangle and in the area of the index information "2.6" of the two-dimensional projected image of the circle, and therefore the projecting point P is closer to the two-dimensional projected image of the rectangle than the two-dimensional projected image of the circle. Furthermore, since the index information is changed according to the magnification ratio, it is possible to determine the degree of closeness. For example, with respect to the distance to the rectangle, it is easily understandable that the projecting point P exists within the range when the original rectangle is expanded 2 times, 4 times by detecting the index information "1.4". By further reducing this magnification ratio and drawing by adding different pieces of index information, it is possible to know the distance between the two-dimensional projected image and the projecting point P in further detail.

Figure 5:
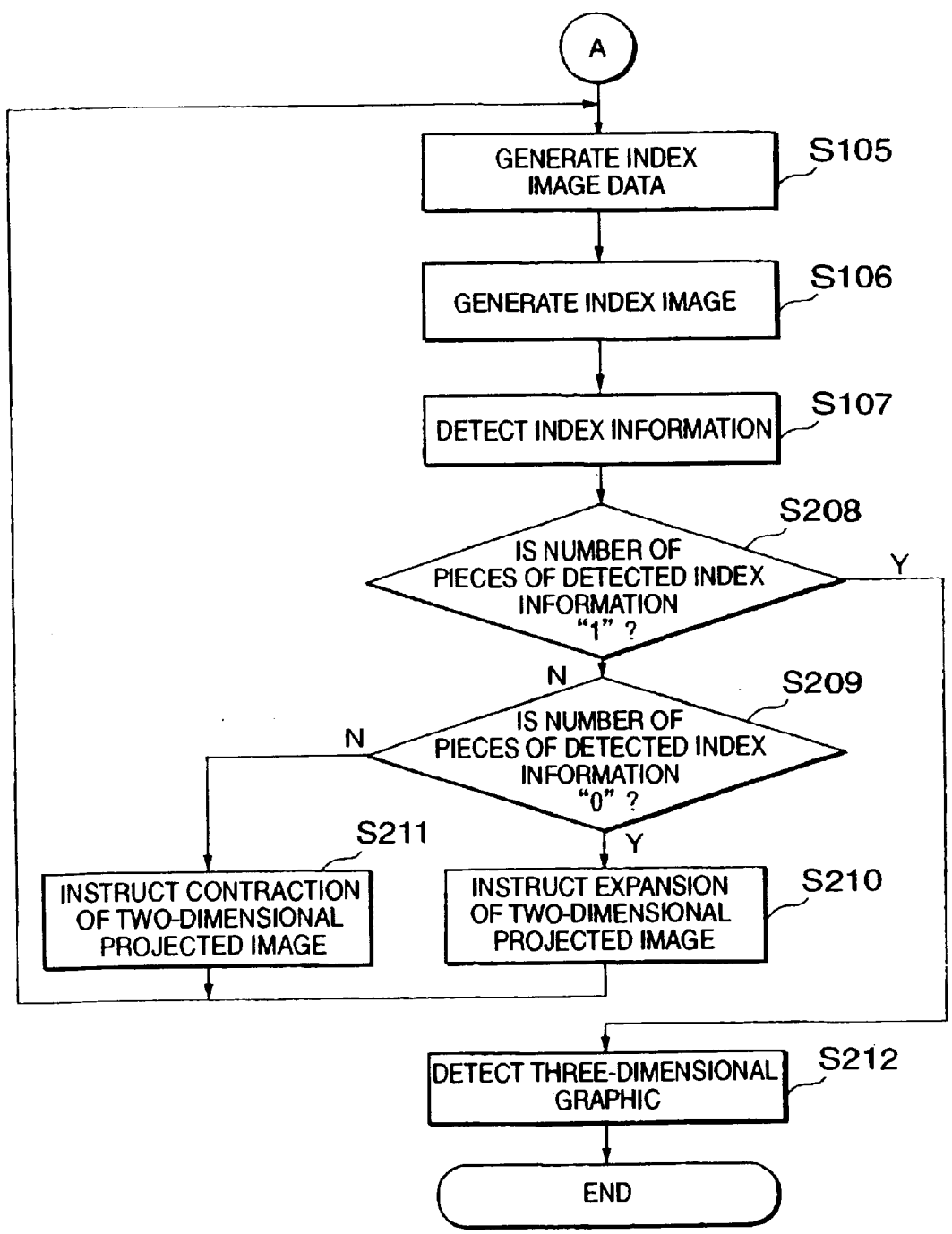
FIG. 5 is a flow chart showing a graphics detecting procedure.

FIG. 5 is a flow chart showing a process of reducing the number of three-dimensional graphics to be detected to one. In the processes, processing of reducing the number of pieces of index information detected to one is added to the graphics detecting step shown in FIG. 4.

Steps S101 to S107 in the detection processing for this three-dimensional graphics constitute the same processing procedure as that shown in FIG. 4, and therefore explanations thereof will be omitted. This processing will be explained starting from step S208 in FIG. 5.

By the way, this processing assumes that no index information is assigned to the area where no three-dimensional graphics of the index image is projected.

When index information is detected in step S107, the graphics detector 104 checks whether the number of pieces of index information detected is one or not (step S208). When the number of pieces of index information detected is not one (step S208: N), the graphics detector 104 checks whether the number of pieces of index information detected is zero or not (step S209). When the number of pieces of index information detected is zero (step S209: Y), the graphics detector 104 sends an instruction to the image controller 102 to expand each two-dimensional projected image (step S210). When the number of pieces of index information detected is not zero (step S209: N), the graphics detector 104 sends an instruction to the image controller 102 to contract each two-dimensional projected image drawn in the frame memory 32 (step S211). When an expansion or contraction (scale-up or scale-down) of the two-dimensional images is instructed, the routine returns to step S105 where the image controller 102 generates index image data by expanding or contracting the two-dimensional projected images according to the instructions (step S105). The index image data generated is sent to the drawing device 103. The drawing device 103 generates an index image from the index image data received (step S106). The two-dimensional projected images in the index image generated is the ones expanded or contracted according to the instructions of the graphics detector 104. The graphics detector 104 detects index information from the index images generate again (step S107).

Figure 8A:
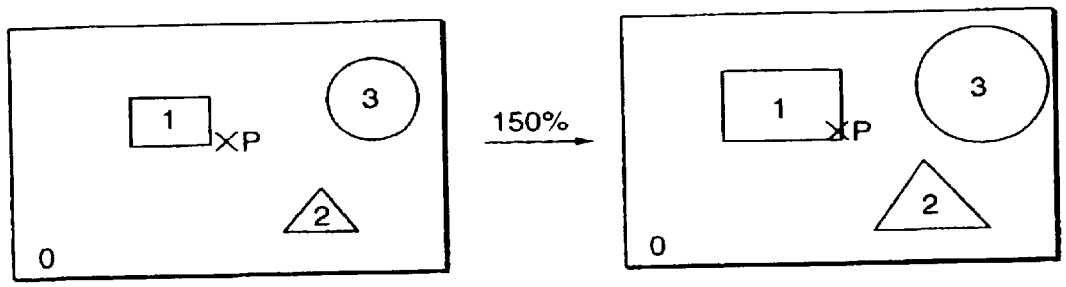
FIG. 8A is an illustrative diagram of an enlarged view of two-dimensional projected images on an index image.

FIG. 8 is a drawing to explain expansion or contraction of two-dimensional projected images. FIG. 8A shows an example of expansion and each two-dimensional projected image is expanded to 150%. By expanding to 150%, index information is drawn on the projecting point P for which no index information has been drawn and the index information is detected.

Figure 8B:
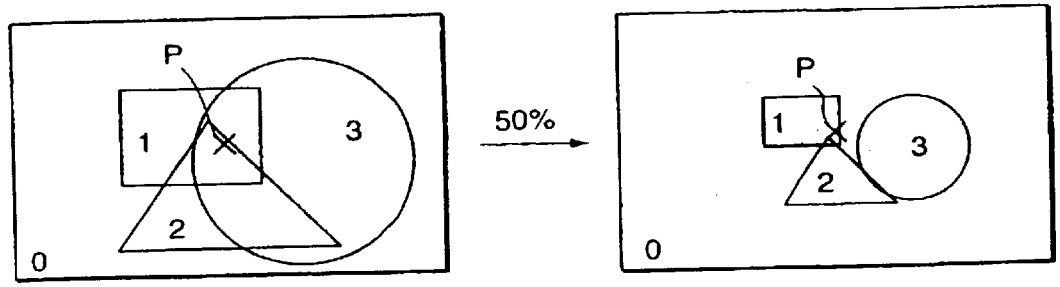
FIG. 8B is an illustrative diagram of a contracted view of two-dimensional projected images on an index image.

FIG. 8B shows an example of contraction and each two-dimensional projected image is contacted to 50%. By contracting to 50%, the number of pieces of index information to be detected on the projecting point P for which three pieces of index information have been detected is reduced to one.

Expansions or contractions of the two-dimensional projected images are repeated until the number of pieces of index information to be detected reaches one.

When the number of pieces of index information detected is one (step S208: Y), a three-dimensional graphic to which the same index information as the detected index information is added is detected (step S212).

Expanding or contracting the two-dimensional projected images to reduce the number of pieces of index information to be detected to one makes it possible to detect a three-dimensional graphic whose two-dimensional projected image is closest to the projecting point P.

Figure 6:
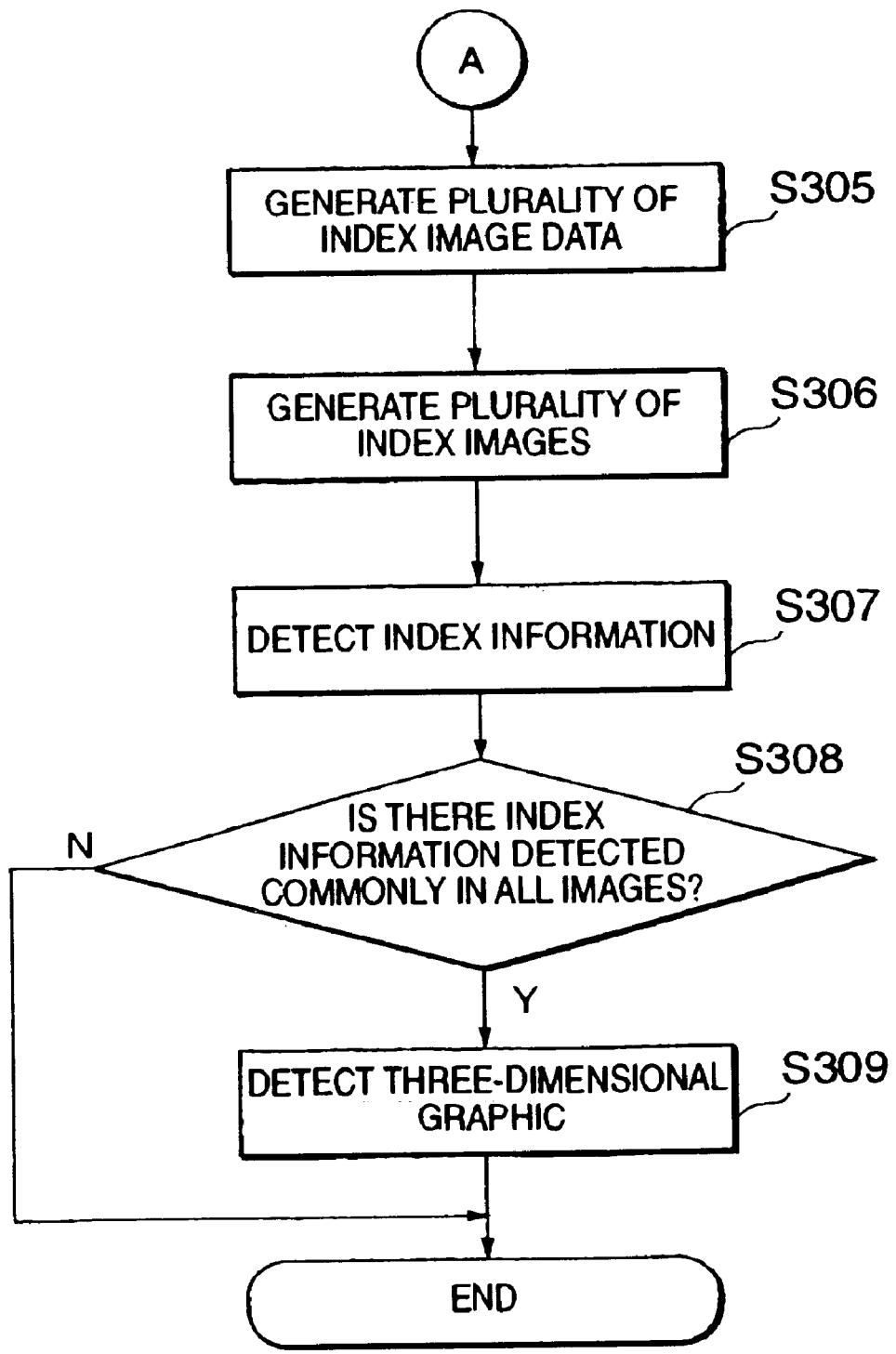
FIG. 6 is a flow chart showing a graphics detecting procedure.

FIG. 6 is a flow chart showing a process of generating a plurality of index image data by projecting a three-dimensional image from a plurality of directions and detecting index information from index images obtained from each index image data.

In the detection processing this three-dimensional graphics, steps S101 to S104 are the same processing procedure as that in FIG. 4 and therefore explanations thereof will be omitted. This processing will be explained starting from step S305 in FIG. 6.

The image controller 102 projects a three-dimensional graphic from a plurality of directions and generates a plurality of index image data (step S305).

Figure 10:
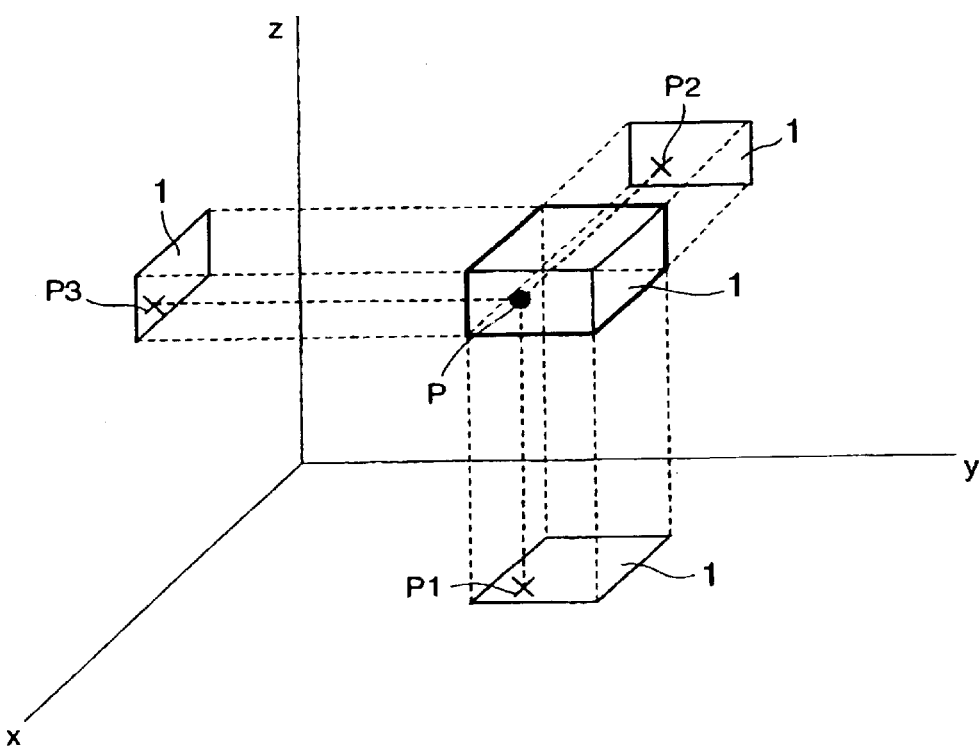
FIG. 10 is an illustrative diagram of a three-dimensional image projected on the XY plane, XZ plane and YZ plane.

The drawing device 103 forms a plurality of index images in a plurality of areas in the frame memory 32 based on a plurality of index image data sent from the image controller 102 (step S306). The plurality of index images are, for example, images obtained by projecting a three-dimensional graphic onto the XY plane, XZ plane and YZ plane in the orthogonal coordinate system with X, Y and Z coordinate axes. FIG. 10 illustrates an example of three index images obtained in this way.

After a plurality of index images is formed, index information at the projecting points P1, P2 and P3 is detected for the respective index images (step S307). With the index information detected from the respective index images, it is checked whether there is index information detected commonly in all the index images or not, or whether there is index information including a numerical value within a preset range (step S308). When the target index information is listed in the table (step S308: Y), a three-dimensional graphic assigned this index information is detected from the table (step S309). When there is no index information detected commonly in all the index images (step S308: N), the graphics detection operation is completed as is.

In the example of FIG. 10, a rectangular parallelepiped with index information "1" is projected onto the XY plane, XZ plane and YZ plane. The point P is found at a position included in the rectangular parallelepiped. Therefore, all pieces of the index information detected at projecting points P1, P2 and P3 of the point P are "1". In such a case, the rectangular parallelepiped can be detected.

This example assumes that a three-dimensional graphic assigned the index information which is commonly detected in all index images is detected, but the present invention is not limited to this and it goes without saying that the three-dimensional graphics may also be detected in at least any one index image.

Through the processing described above, it is possible to detect a three-dimensional graphic at a position including a predetermined point in the three-dimensional image.

Furthermore, by expanding or contracting a two-dimensional projected image in each index image, it is also possible to detect which three-dimensional graphics is at the closest position.

This embodiment describes an example with an entertainment apparatus. However, in addition to the entertainment apparatus, the present invention can also be implemented by allowing a general-purpose computer equipped with an image processing function to load and execute program codes recorded in a recording medium according to the present invention.

The present invention described above makes it possible to speedily detect a three-dimensional graphic having a specific relationship with a predetermined point in an image without wasting hardware resources. The present invention further makes it possible to detect a three-dimensional graphic whose two-dimensional projected image is closest to the projecting point of the predetermined point in the image regardless of the shape of the graphics.

Various embodiments and changes may be made thereunto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A method of detecting a three-dimensional graphic which has a specific positional relationship with a predetermined point, comprising:

assigning first identification information to each of one or more three-dimensional graphics, said first identification information identifying respective ones of said three-dimensional graphics;

projecting at least one of said three-dimensional graphics onto a predetermined plane to produce a corresponding two-dimensional image;

assigning second identification information to each of said corresponding two-dimensional images, said second identification information corresponding to said first identification information;

detecting said second identification information assigned to a specified two-dimensional image when a predetermined point in said predetermined plane is located in said specified two-dimensional image;

using said detected second identification information, identifying one of said three-dimensional graphics corresponding to said specified two-dimensional image, said one three-dimensional graphic having a specific positional relationship with said predetermined point.

2. A method as claimed in claim 1, wherein said at least one three-dimensional graphic is projected onto said predetermined plane at a plurality of magnification levels to produce a plurality of said corresponding two-dimensional images having different sizes.

3. A method as claimed in claim 2, wherein said magnification levels are selected from the group consisting of ascending levels, such that each succeeding two-dimensional image is larger than an immediately preceding two-dimensional image, and descending levels, such that each succeeding two-dimensional image is smaller than an immediately preceding two-dimensional image.

4. A method as claimed in claim 2, wherein said second identification information varies according to said magnification level.

5. A method as claimed in claim 4, wherein said second identification information is assigned in the order of said magnification levels.

6. A method as claimed in claim 2, wherein said at least one three-dimensional graphic is simultaneously projected onto said predetermined plane at each of said plurality of magnification levels to simultaneously produce said plurality of corresponding two-dimensional images having different sizes.

7. A method as claimed in claim 6, wherein said second identification information is assigned in the order of said magnification levels.

8. A method as claimed in claim 1, wherein said at least one three-dimensional graphic is successively projected onto said predetermined plane using different magnification levels until said second identification information is detected for said specified two-dimensional image in which said predetermined point is located.

9. A method as claimed in claim 8, wherein said second identification information includes a numerical value uniquely identifying said at least one three-dimensional graphic, and additional information which varies according to said magnification level used to project said at least one three-dimensional graphic onto said predetermined plane, wherein said method further comprises varying said magnification level by varying said additional information, and detecting a degree of closeness between said corresponding two-dimensional image and said predetermined point.

10. A method as claimed in claim 2, wherein said second identification information includes additional information which varies according to a size of said two-dimensional image; and said method further comprises varying said additional information in accordance with said magnification level.

11. A method as claimed in claim 10, further comprising detecting a degree of closeness between at least one of said two-dimensional images and said predetermined point by varying said additional information to vary said size of said at least one two-dimensional image, and detecting for each said size whether said predetermined point falls within said at least one two-dimensional image.

12. A method as claimed in claim 10, wherein said second identification information includes a numerical value having a plurality of digits, wherein at least one of said plurality of digits identifies said three-dimensional graphic, and at least one other of said plurality of digits indicates said additional information.

13. A method as claimed in claim 1, further comprising assigning third identification information to an area of said predetermined plane where none of said corresponding two-dimensional images is located, said third identification information differing from said first identification information.

14. A method as claimed in claim 1, wherein said at least one three-dimensional graphic is projected onto a plurality of predetermined planes to produce a plurality of corresponding two-dimensional images, wherein said at least one three-dimensional graphic is identified by determining whether said predetermined point is located in any of said two-dimensional images in any of said predetermined planes.

15. A method as claimed in claim 14, wherein said at least one three-dimensional graphic is identified by detecting said second identification information for each of said two-dimensional images.

16. A method as claimed in claim 15, wherein said three-dimensional graphic is identified by determining that numerical values of said second identification information assigned to said plurality of two-dimensional images fall within respective ranges assigned to said second identification information.

17. An apparatus for detecting a three-dimensional graphic which has a specific positional relationship with a predetermined point, comprising:

a processing system operable to assign first identification information to each of one or more three-dimensional graphics, said first identification information identifying respective ones of said three-dimensional graphics, to project at least one of said three-dimensional graphics onto a predetermined plane to produce a corresponding two-dimensional image, to assign second identification information to each of said corresponding two-dimensional images, said second identification information corresponding to said first identification information, to detect said second identification information assigned to a specified two-dimensional image when a predetermined point in said predetermined plane is located in said specified two-dimensional image, and to identify said three-dimensional graphic that has a specific positional relationship with said predetermined point, by using said detected second identification information.

18. A microelectronic device for detecting a three-dimensional graphic which has a specific positional relationship with a predetermined point, comprising:

a processing system operable to assign first identification information to each of one or more three-dimensional graphics, said first identification information identifying respective ones of said three-dimensional graphics, to project at least one of said three-dimensional graphics onto a predetermined plane to produce a corresponding two-dimensional image, to assign second identification information to each of said corresponding two-dimensional images, said second identification information corresponding to said first identification information, to detect said second identification information assigned to a specified two-dimensional image when a predetermined point in said predetermined plane is located in said specified two-dimensional image, and to identify said three-dimensional graphic that has a specific positional relationship with said predetermined point, by using said detected second identification information.

19. A machine readable storage medium having machine-readable instructions recorded thereon, for performing a method of detecting a three-dimensional graphic which has a specific positional relationship with a predetermined point, the method comprising:

assigning first identification information to each of one or more three-dimensional graphics, said first identification information identifying respective ones of said three-dimensional graphics;

projecting at least one of said three-dimensional graphics onto a predetermined plane to produce a corresponding two-dimensional image;

assigning second identification information to each of said corresponding two-dimensional images, said second identification information corresponding to said first identification information;

detecting said second identification information assigned to a specified two-dimensional image when a predetermined point in said predetermined plane is located in said specified two-dimensional image;

using said detected second identification information, identifying one of said three-dimensional graphics corresponding to said specified two-dimensional image, said one three-dimensional graphic having a specific positional relationship with said predetermined point.

* * * * *